US012085099B1

(12) United States Patent
Sparks, II

(10) Patent No.: US 12,085,099 B1
(45) Date of Patent: Sep. 10, 2024

(54) FLOW CONTROL BLOCK FOR USE WITH A VACUUM MATERIAL HANDLER

(71) Applicant: Vacuworx Global, LLC, Tulsa, OK (US)

(72) Inventor: Keith A. Sparks, II, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 0 days.

(21) Appl. No.: 17/352,007

(22) Filed: Jun. 18, 2021

Related U.S. Application Data

(60) Provisional application No. 63/040,805, filed on Jun. 18, 2020.

(51) Int. Cl.
*F15B 13/08* (2006.01)
*F15B 13/02* (2006.01)

(52) U.S. Cl.
CPC ........ *F15B 13/0814* (2013.01); *F15B 13/024* (2013.01); *F15B 13/0842* (2013.01); *F15B 13/0871* (2013.01); *F15B 2211/50554* (2013.01); *F15B 2211/55* (2013.01); *Y10T 137/6007* (2015.04)

(58) Field of Classification Search
CPC F15B 13/0842; F15B 13/0871; F15B 13/024; F15B 13/0814; F15B 2211/46; F15B 2211/351; F15B 2211/353; F15B 2211/5152; F15B 2211/6052; F15B 2211/6055; F15B 2211/45; F15B 2211/853; F15B 2211/455; F15B 2211/50554; F15B 2211/50527; F15B 2211/50518; F15B 2211/55; F15B 11/042; F15B 11/044; F15B 11/0413; F15B 11/0406; F15B 11/08; F15B 21/0423; F15B 2211/40576; F15B 2211/40592; F15B 2211/40584; E02F 9/2225; E02F 9/2267; E02F 9/2275; E02F 9/2278; Y10T 137/87885; Y10T 137/87306; Y10T 137/87249; Y10T 137/87708; Y10T 137/0486; Y10T 137/0502; Y10T 137/6007; F16H 61/4104
USPC .............................. 60/466, 468, 493; 91/420
See application file for complete search history.

(56) References Cited

U.S. PATENT DOCUMENTS 2,720,755 A * 10/1955 Gardiner ................ F15B 13/01 91/196
2,959,190 A * 11/1960 Barnes .................... F15B 13/01 137/553
3,198,088 A * 8/1965 Johnson ................ F15B 13/015 251/38

(Continued)

FOREIGN PATENT DOCUMENTS

CA 2279435 A1 * 1/2001 .............. F15B 1/024

*Primary Examiner* — Craig J Price
(74) *Attorney, Agent, or Firm* — GableGotwals

(57) ABSTRACT

A manifold block is provided for locating between a hydraulic pressure supply and a piece of equipment, such as a material handler. The manifold block allows for bidirectional flow and provides both flow and pressure control in the supply direction, but not in the return direction. The manifold block allows for the equipment to be protected from experiencing fluid pressure or a flow rate that is higher than limits set in the manifold block, thereby protecting hydraulically powered equipment, e.g., a material handler, regardless of the hydraulic supply parameters of a machine to which it is attached.

6 Claims, 6 Drawing Sheets

(56) References Cited

U.S. PATENT DOCUMENTS

| | | | | | |
|---|---|---|---|---|---|
| 3,250,185 | A * | 5/1966 | Tolbert | F15B 13/015 | 137/596.2 |
| 3,272,085 | A * | 9/1966 | Hajma | F15B 13/01 | 251/38 |
| 3,302,922 | A * | 2/1967 | Jorgji | F15B 13/01 | 137/596.13 |
| 3,381,587 | A * | 5/1968 | Parquet | F15B 13/01 | 416/157 R |
| 3,407,946 | A * | 10/1968 | Pilch | E02F 3/384 | 91/410 |
| 3,411,536 | A * | 11/1968 | Tennis | F15B 11/006 | 60/466 |
| 3,472,261 | A * | 10/1969 | Brannon | F15B 13/01 | 137/493 |
| 3,530,766 | A * | 9/1970 | Pilch | F15B 11/046 | 91/410 |
| 3,549,209 | A * | 12/1970 | Dieter | B60T 7/12 | 303/177 |
| 3,576,192 | A * | 4/1971 | Wood | B63H 25/22 | 91/420 |
| 3,678,684 | A * | 7/1972 | Sorensen | F15B 11/17 | 60/473 |
| 3,680,588 | A * | 8/1972 | Hufeld | F16K 31/12 | 91/454 |
| 3,771,424 | A * | 11/1973 | Allen | B62D 5/061 | 91/433 |
| 3,818,936 | A * | 6/1974 | Jackoboice | F15B 13/01 | 137/596.12 |
| 3,857,404 | A * | 12/1974 | Johnson | F15B 13/01 | 91/420 |
| 3,908,515 | A * | 9/1975 | Johnson | F15B 13/01 | 91/464 |
| 3,929,159 | A * | 12/1975 | McAvoy | F15B 13/01 | 91/464 |
| 3,974,742 | A * | 8/1976 | Johnson | F15B 13/01 | 91/452 |
| 4,008,731 | A * | 2/1977 | Katz | F15B 13/01 | 137/501 |
| 4,012,031 | A * | 3/1977 | Mitchell | F15B 13/01 | 91/420 |
| 4,201,052 | A * | 5/1980 | Breeden | F15B 11/042 | 91/461 |
| 4,266,464 | A * | 5/1981 | Baatrup | B62D 5/09 | 91/29 |
| 4,266,466 | A * | 5/1981 | Ziems | B62D 5/08 | 91/445 |
| 4,301,832 | A * | 11/1981 | Smith | F15B 13/02 | 91/530 |
| 4,316,599 | A * | 2/1982 | Bouvet | F16K 31/0613 | 251/129.08 |
| 4,381,701 | A * | 5/1983 | Maistrelli | F03C 1/0681 | 91/499 |
| 4,475,442 | A * | 10/1984 | Breeden | F15B 13/02 | 91/461 |
| 4,480,527 | A * | 11/1984 | Lonnemo | F15B 13/02 | 91/438 |
| 4,520,625 | A * | 6/1985 | Sato | F16H 61/4157 | 60/494 |
| 4,531,369 | A * | 7/1985 | Izumi | F16H 39/02 | 60/464 |
| 4,610,193 | A * | 9/1986 | Barker | F15B 11/003 | 91/421 |
| 4,611,527 | A * | 9/1986 | Breeden | F15B 13/02 | 91/461 |
| 4,628,690 | A * | 12/1986 | Arai | F16H 61/40 | 60/494 |
| 5,018,935 | A * | 5/1991 | Gage | F15B 13/01 | 91/420 |
| 5,197,283 | A * | 3/1993 | Kagiwada | F16H 61/4139 | 60/451 |
| 5,211,015 | A * | 5/1993 | Schroeder | F03C 1/0684 | 60/489 |
| 5,335,495 | A * | 8/1994 | Sato | F15B 13/02 | 60/466 |
| 5,799,485 | A * | 8/1998 | Nakamura | C02F 1/5272 | 210/912 |
| 5,977,730 | A * | 11/1999 | Clutter | B66C 1/08 | 318/158 |
| 6,164,327 | A * | 12/2000 | Yoshida | F15B 13/021 | 91/452 |
| 6,354,081 | B1 * | 3/2002 | Burton | F15B 11/20 | 15/82 |
| 6,367,365 | B1 * | 4/2002 | Weickert | F15B 11/05 | 91/447 |
| 6,474,064 | B1 * | 11/2002 | Heyne | E02F 9/2207 | 91/38 |
| 6,477,937 | B1 * | 11/2002 | Horn | F15B 11/0413 | 91/464 |
| 6,499,505 | B2 * | 12/2002 | Zenker | F15B 13/01 | 137/596.2 |
| 6,516,706 | B2 * | 2/2003 | Porter | F16D 41/10 | 91/445 |
| 6,519,939 | B1 * | 2/2003 | Duff | F15B 1/024 | 60/473 |
| 6,539,712 | B2 * | 4/2003 | Konishi | F15B 11/0445 | 91/445 |
| 6,543,223 | B2 * | 4/2003 | Muschong | F15B 15/18 | 91/454 |
| 6,625,983 | B2 * | 9/2003 | Kawasaki | F16D 31/02 | 60/473 |
| 6,647,721 | B2 * | 11/2003 | Heyne | B60T 17/04 | 60/468 |
| 6,732,513 | B2 * | 5/2004 | Tajima | E02F 9/2207 | 60/468 |
| 6,786,441 | B2 * | 9/2004 | Osterloh | F15B 11/003 | 242/129 |
| 6,792,844 | B1 * | 9/2004 | Gedge | F15B 13/021 | 251/63.4 |
| 6,868,672 | B2 * | 3/2005 | Luo | F15B 13/0402 | 91/466 |
| 6,871,574 | B2 * | 3/2005 | Barber | F15B 13/044 | 91/420 |
| 6,886,332 | B2 * | 5/2005 | Kubinski | F15B 11/022 | 60/475 |
| 6,895,852 | B2 * | 5/2005 | Pieper | E02F 9/2225 | 91/516 |
| 6,962,050 | B2 * | 11/2005 | Hiraki | F15B 11/17 | 60/486 |
| 6,983,585 | B2 * | 1/2006 | Hattori | F01K 9/04 | 60/39.182 |
| 6,997,210 | B2 * | 2/2006 | Horn | F15B 11/044 | 91/464 |
| 7,069,723 | B2 * | 7/2006 | Yamamoto | F15B 13/021 | 60/468 |
| 7,104,181 | B2 * | 9/2006 | Bitter | F15B 11/024 | 91/437 |
| 7,150,150 | B2 * | 12/2006 | Bigo | E02F 9/2296 | 60/468 |
| 7,191,593 | B1 * | 3/2007 | Ho | B64C 13/504 | 60/473 |
| 7,263,924 | B2 * | 9/2007 | Ioku | F15B 11/044 | 137/596.13 |
| 7,320,272 | B2 * | 1/2008 | Zitterbart | E02F 9/2271 | 91/468 |
| 7,398,648 | B2 * | 7/2008 | Tatsuno | F16H 61/4148 | 60/449 |
| 7,454,906 | B2 * | 11/2008 | Kauss | E02F 9/2207 | 60/468 |
| 7,752,842 | B2 * | 7/2010 | Hristov | B66F 9/22 | 91/464 |
| 7,788,914 | B2 * | 9/2010 | Rho | F16K 31/1635 | 60/402 |
| 7,841,360 | B2 * | 11/2010 | Bruck | G05D 16/166 | 137/625.68 |
| 7,921,642 | B2 * | 4/2011 | Ino | E02F 9/2282 | 60/468 |
| 8,001,882 | B2 * | 8/2011 | Hyang | F15B 13/01 | 91/464 |

(56) References Cited

U.S. PATENT DOCUMENTS

| | | | | |
|---|---|---|---|---|
| 8,122,714 | B2 * | 2/2012 | Yatabe | F16H 61/4061 60/443 |
| 8,186,082 | B2 * | 5/2012 | Sato | F15B 7/006 37/234 |
| 8,201,404 | B2 * | 6/2012 | Satake | F16H 61/4165 60/466 |
| 8,297,924 | B2 * | 10/2012 | Mori | B64C 27/64 60/473 |
| 8,671,824 | B2 * | 3/2014 | Kauss | F15B 11/024 91/464 |
| 8,752,373 | B2 * | 6/2014 | Yamashita | E02F 9/2095 60/468 |
| 8,826,653 | B2 * | 9/2014 | Komiyama | E02F 9/128 60/403 |
| 8,881,519 | B2 * | 11/2014 | Kamimura | E02F 9/2228 60/414 |
| 8,997,626 | B2 * | 4/2015 | Anderson | F16K 15/044 91/437 |
| 9,068,322 | B2 * | 6/2015 | Park | F15B 13/015 |
| 9,249,879 | B2 * | 2/2016 | Ishikawa | F16H 61/4061 |
| 9,261,114 | B2 * | 2/2016 | Kim | E02F 9/2282 |
| 9,562,544 | B2 * | 2/2017 | Clausen | F15B 11/032 |
| 9,611,871 | B2 * | 4/2017 | Kot | F15B 13/01 |
| 9,829,013 | B2 * | 11/2017 | Cho | F15B 11/10 |
| 9,926,676 | B1 * | 3/2018 | Beckhusen | E01C 19/34 |
| 9,976,659 | B2 * | 5/2018 | Preston | F16K 15/1823 |
| 10,024,342 | B2 * | 7/2018 | Terao | F15B 13/026 |
| 10,138,908 | B2 * | 11/2018 | Vacca | F04C 15/008 |
| 10,163,334 | B1 * | 12/2018 | Capps | B66C 1/0262 |
| 10,280,589 | B2 * | 5/2019 | Oka | F15B 11/16 |
| 10,527,068 | B2 * | 1/2020 | Parthasarathy | F15B 1/265 |
| 10,767,674 | B2 * | 9/2020 | Kai | F15B 7/006 |
| 10,982,761 | B2 * | 4/2021 | Mitsui | F15B 7/006 |
| 11,247,873 | B2 * | 2/2022 | Solomon | B66C 1/0287 |
| 11,578,474 | B2 * | 2/2023 | De Gier | F15B 15/202 |
| 11,619,027 | B1 * | 4/2023 | Bradley | E02F 3/3654 60/422 |
| 11,680,649 | B2 * | 6/2023 | Eichler | F15B 1/26 60/325 |
| 11,761,175 | B2 * | 9/2023 | Kondo | F15B 11/08 60/327 |
| 2002/0092417 | A1 * | 7/2002 | Suzuki | F15B 11/0445 91/445 |
| 2003/0145588 | A1 * | 8/2003 | Kubinski | F15B 7/006 60/475 |
| 2003/0201354 | A1 * | 10/2003 | Osterloh | B65H 49/16 242/131 |
| 2005/0109026 | A1 * | 5/2005 | Bigo | E02F 9/226 60/468 |
| 2006/0026955 | A1 * | 2/2006 | Bogelein | F15B 11/0423 60/464 |
| 2010/0183415 | A1 * | 7/2010 | Solomon | B66C 13/12 414/627 |
| 2011/0248196 | A1 * | 10/2011 | Anderson | F16K 17/0406 251/30.01 |
| 2011/0283692 | A1 * | 11/2011 | Satake | F15B 11/08 60/460 |
| 2014/0190158 | A1 * | 7/2014 | Uenishi | F15B 21/041 60/459 |
| 2015/0052888 | A1 * | 2/2015 | Clausen | F15B 3/00 60/547.1 |
| 2015/0219124 | A1 * | 8/2015 | Kim | F15B 13/025 60/371 |
| 2017/0268201 | A1 * | 9/2017 | Joung | E02F 9/2004 |
| 2017/0342686 | A1 * | 11/2017 | Jeon | F15B 13/015 |
| 2019/0055966 | A1 * | 2/2019 | Parthasarathy | F15B 20/002 |
| 2019/0234431 | A1 * | 8/2019 | Tanaka | F15B 11/044 |
| 2020/0340210 | A1 * | 10/2020 | Katsura | F16H 61/4061 |
| 2021/0404486 | A1 * | 12/2021 | Takakuwa | F16K 11/0712 |
| 2022/0145770 | A1 * | 5/2022 | Yang | F01D 17/10 |
| 2023/0192053 | A1 * | 6/2023 | Porten | B60T 17/222 303/11 |
| 2024/0035586 | A1 * | 2/2024 | Zähe | F15B 13/0405 |

* cited by examiner

FLOW CONTROL BLOCK FOR USE WITH A VACUUM MATERIAL HANDLER

CROSS REFERENCE TO RELATED APPLICATIONS

This application claims the priority of U.S. Provisional Patent Application No. 63/040,805 titled "FLOW CONTROL BLOCK FOR USE WITH A VACUUM MATERIAL HANDLER," filed Jun. 18, 2020, the contents of which are hereby incorporated by reference.

FIELD OF THE INVENTION

The subject matter of this disclosure relates to a manifold block for use with equipment, such as a material handler. More particularly, the disclosure relates to a manifold block that controls flow and pressure in the supply direction, but not in the return direction.

BACKGROUND OF THE INVENTION

Traditional vacuum lifters or material handlers are mounted on the boom of a full-size excavator, backhoe or other heavy equipment and are commonly used to move large diameter pipe and flat stock steel. These lifters have a beam suspended from the boom. The beam carries a vacuum reservoir and a drive motor coupled to a vacuum pump. One or more vacuum pads are suspended from the beam. The vacuum pads are contoured to the item being lifted. The boom and beam are maneuvered to put the vacuum pad in contact with the surface of the item to be lifted. Once in contact a valve is opened to create a vacuum between the pad and the surface of the item. When the vacuum reaches an acceptable level, the boom and beam can be maneuvered to lift the item.

Hydraulically powered equipment, such as a rotator for a vacuum lifter or material handler, is typically powered by a hydraulic supply on the excavator, backhoe or other heavy equipment. Since the hydraulically powered equipment may potentially be mated with a hydraulic supply of non-conforming specifications, it is desirable to provide protection for the hydraulically powered equipment.

SUMMARY OF THE INVENTION

A manifold block is provided for locating between a hydraulic pressure supply and a piece of equipment, such as a material handler. The manifold block allows for bidirectional flow and provides both flow and pressure control in the supply direction, but not in the return direction. The manifold block allows for the equipment to be protected from experiencing fluid pressure or a flow rate that is higher than limits set in the manifold block, thereby protecting hydraulically powered equipment, e.g., a material handler, regardless of the hydraulic supply parameters of a machine to which it is attached.

More particularly, a manifold block is provided for locating between a hydraulic supply and hydraulically powered equipment for protecting the hydraulically powered equipment. The manifold block has a manifold block body having a first side and a second side. The first side of the manifold block body is for communicating with the hydraulic supply. The first side defines a first port and a second port. Hydraulic fluid at a first pressure and at a first flow rate passes through a selected one of the first port and the second port, e.g., selected by an A/B switch, into the manifold block body. The second side of the manifold block body communicates with the hydraulically powered equipment. The second side defines a first interface port and a second interface port.

A first pressure controller in the manifold block body is provided for controlling a pressure of fluid passing out of the first interface port. A second pressure controller in the manifold block body is provided for controlling a pressure of fluid passing out of the second interface port.

A first flow controller in the manifold block body is provided for controlling a fluid flow rate of fluid passing out of the first interface port. A second flow controller in the manifold block body is provided for controlling a fluid flow rate of fluid passing out of the second interface port.

In use, the method of protecting hydraulically powered equipment for connection to a machine having a hydraulic supply includes the steps of locating a manifold block body between the hydraulic supply and the hydraulically powered equipment, the manifold block body defining a first side and a second side, communicating the first side with the hydraulic supply, the first side defining a first port and a second port, communicating the second side with the hydraulically powered equipment, the second side defining a first interface port and a second interface port. The method further includes flowing fluid at a first pressure and at a first flow rate through a selected one of the first port and the second port into the manifold block body, and controlling pressure and flow rate of fluid passing out of the first interface port or the second interface port and into the hydraulically powered equipment.

DETAILED DESCRIPTION OF THE PREFERRED EMBODIMENTS

Figure 1:
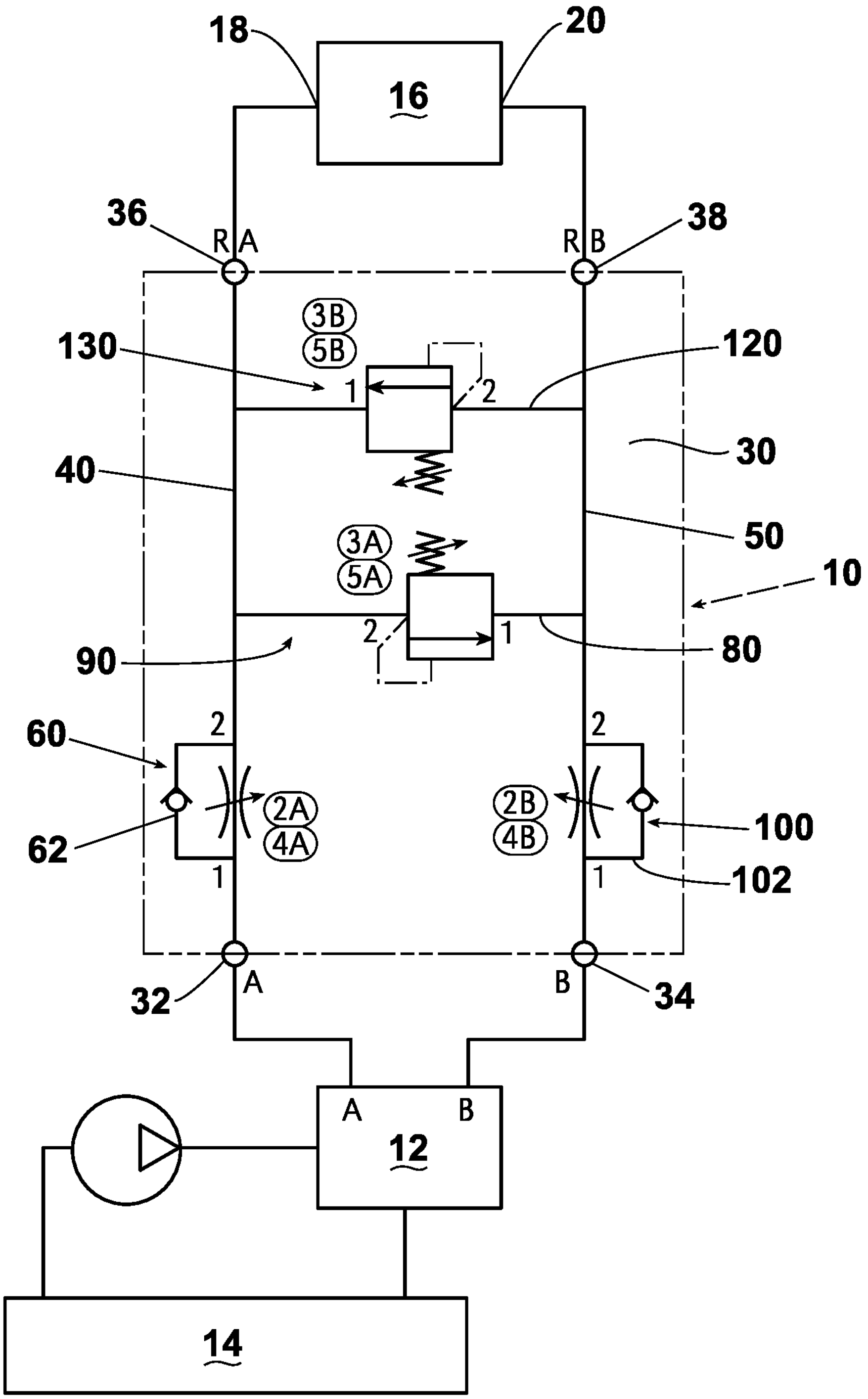
FIG. 1 is a schematic of an embodiment of a manifold block of this disclosure for use with equipment wherein the flow control block is shown via a hydraulic circuit diagram.
Figure 2:
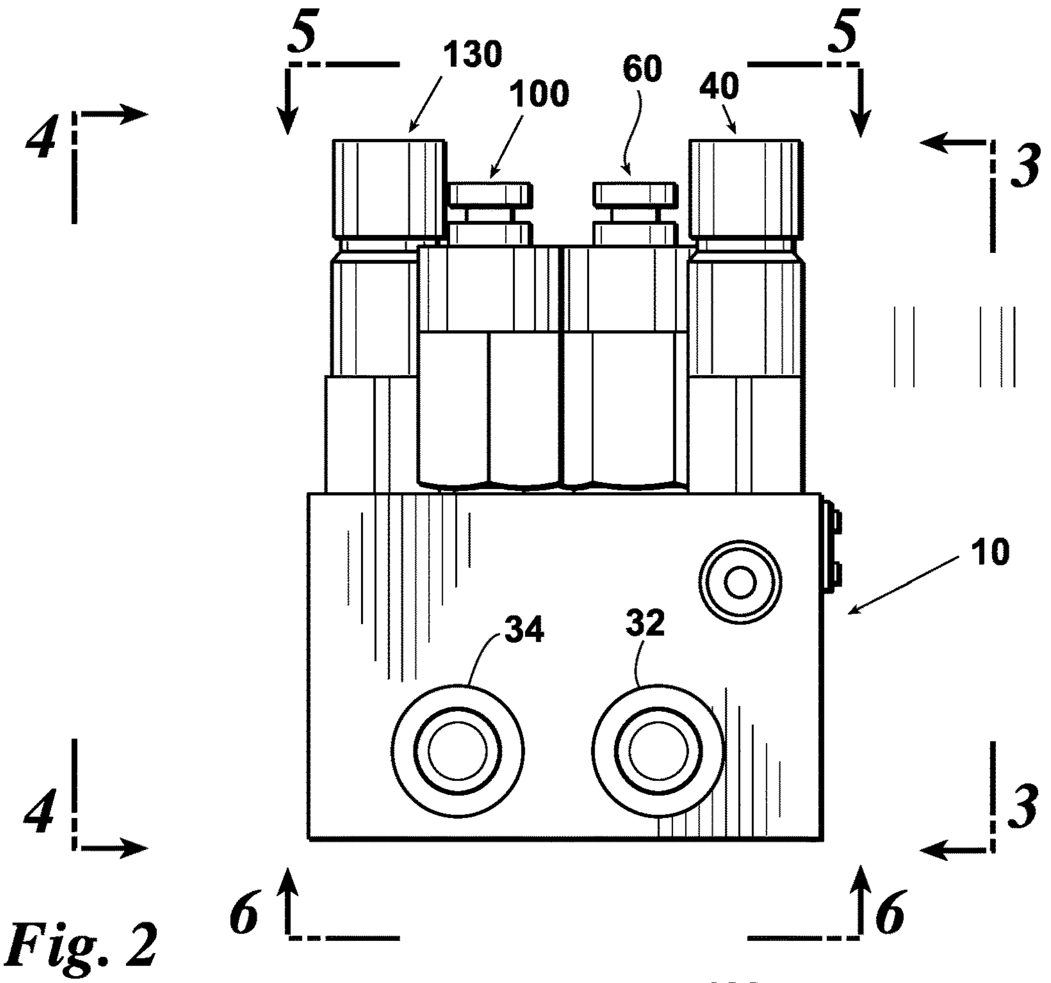
FIG. 2 is front elevation view of the manifold block of FIG. 1.
Figure 3:
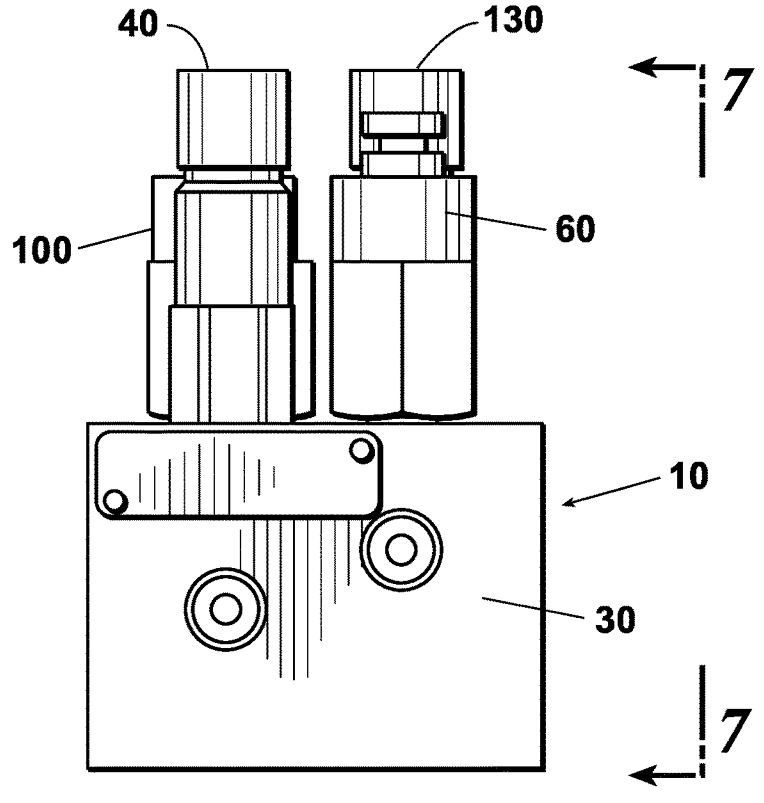
FIG. 3 is a right side view of the manifold block of FIG. 2 taken along lines 2-2 of FIG. 2.
Figure 4:
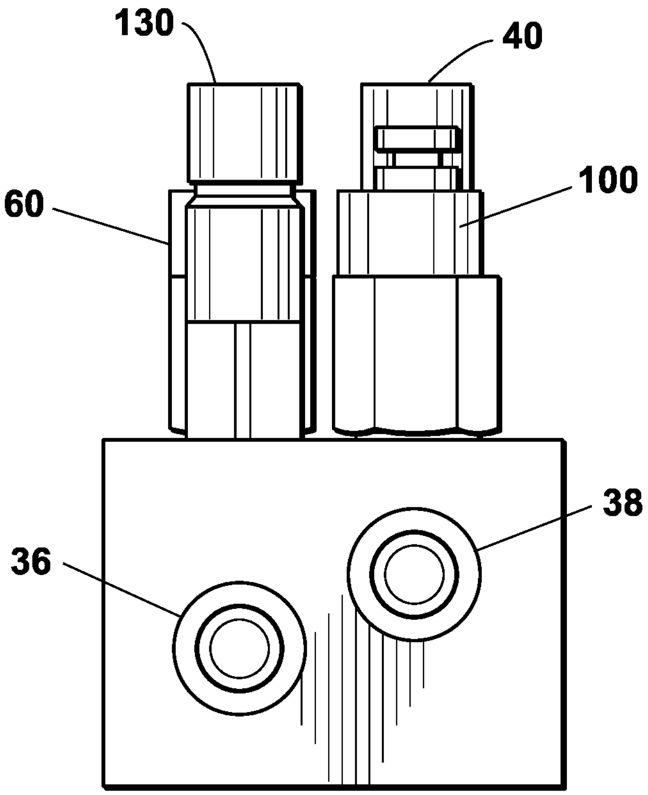
FIG. 4 is a left side view of the manifold block of FIG. 2 taken along lines 4-4 of FIG. 2.
Figure 5:
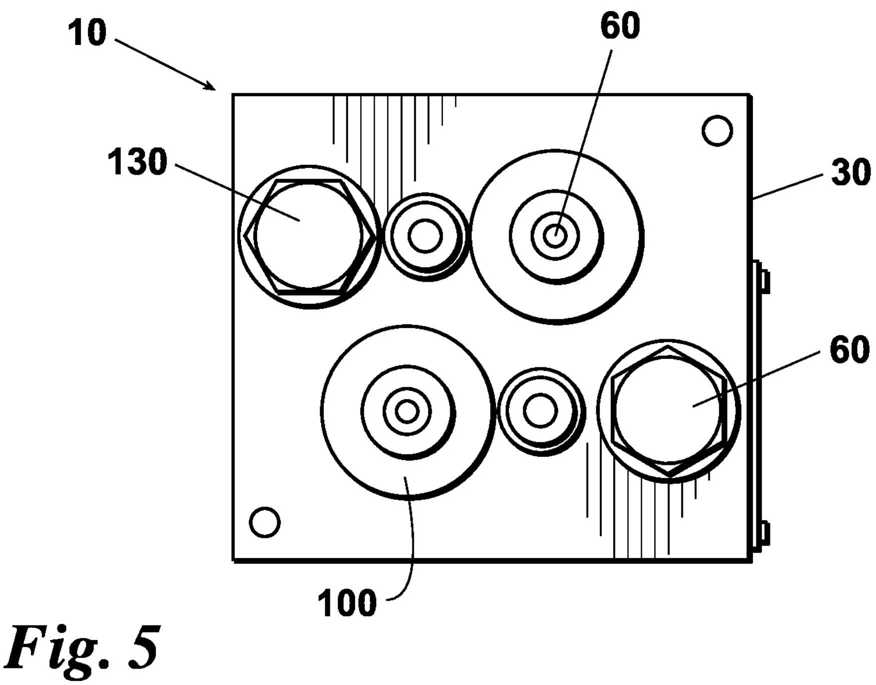
FIG. 5 is a plan view of the manifold block of FIG. 2 taken along lines 5-5 of FIG. 2.
Figure 6:
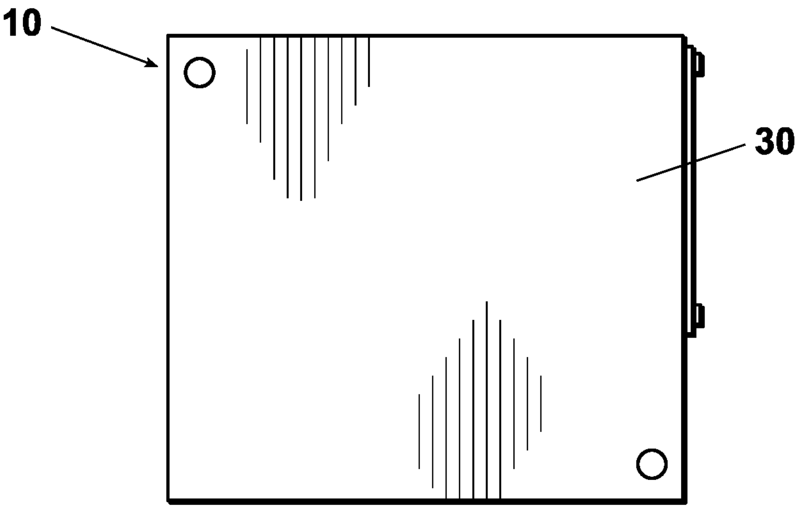
FIG. 6 is a plan view of the manifold block of FIG. 2 taken along lines 6-6 of FIG. 2.
Figure 7:
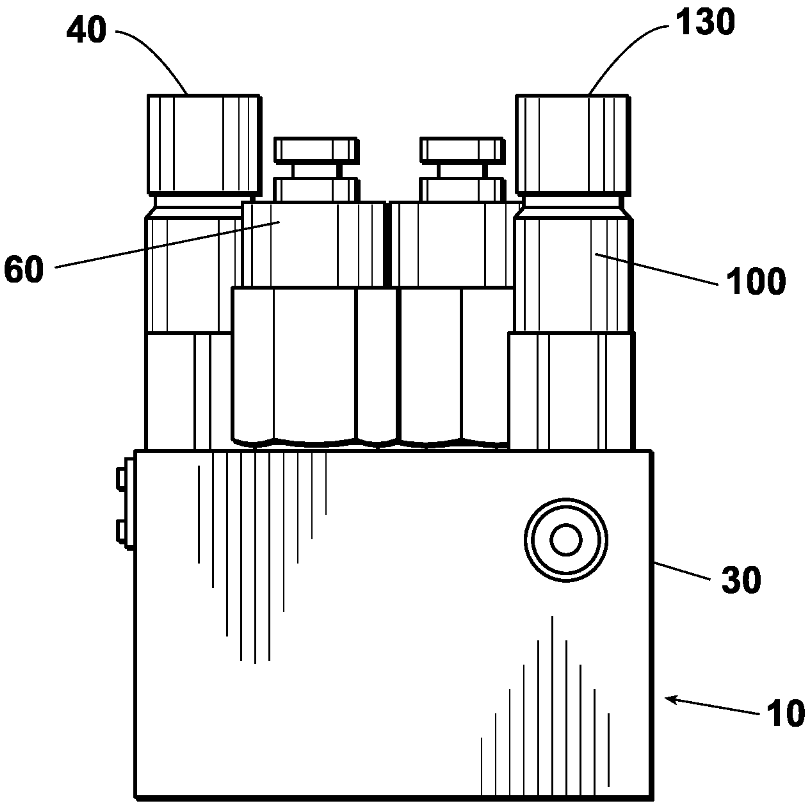
FIG. 7 is a back elevation view of the manifold block of FIGS. 2 and 3 taken along lines 7-7 of FIG. 3.
Figure 8:
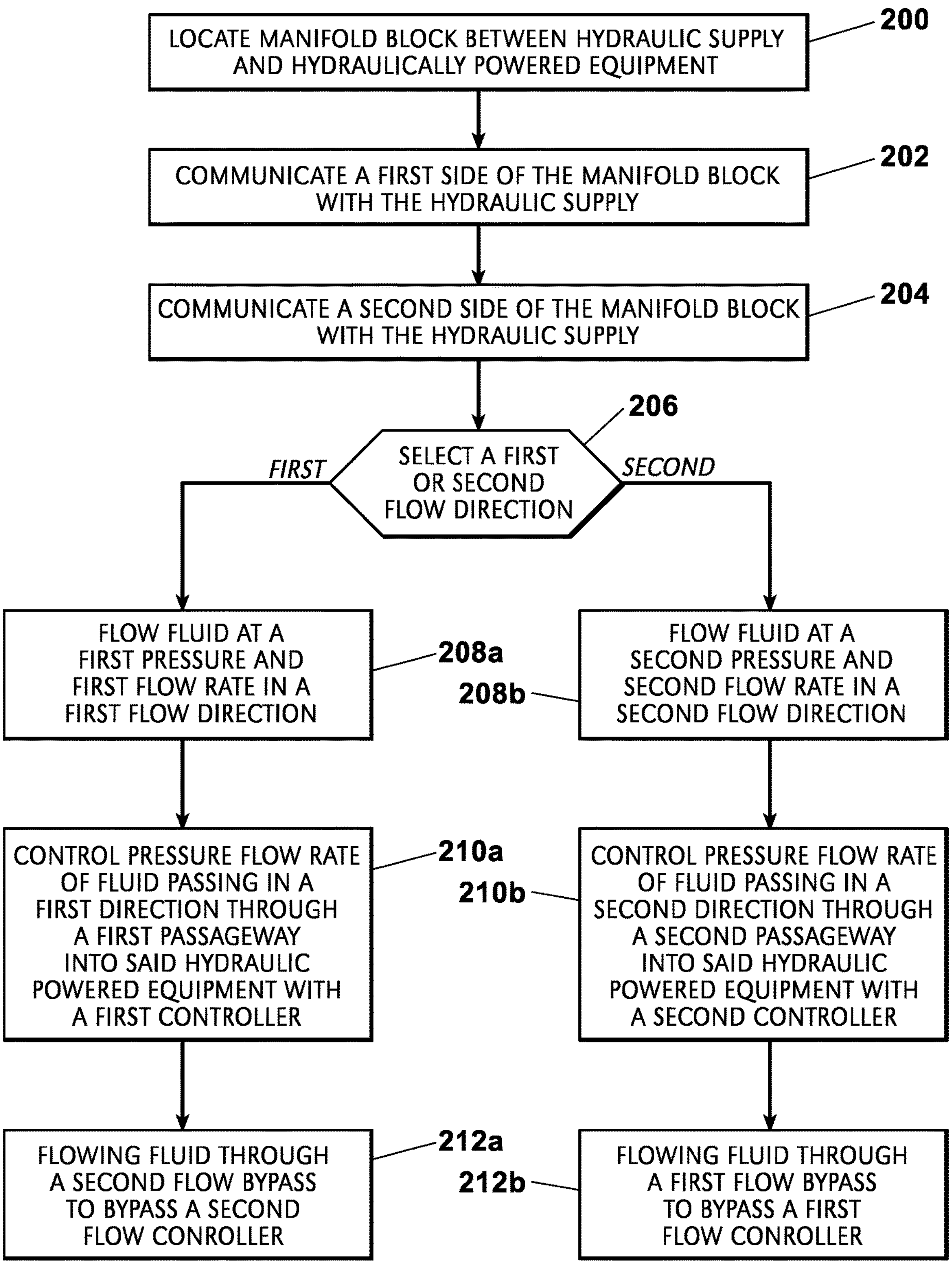
FIG. 8 is a flow chart depicting a method of protecting hydraulically powered equipment for connection to a machine having a hydraulic supply.
Figure 9:
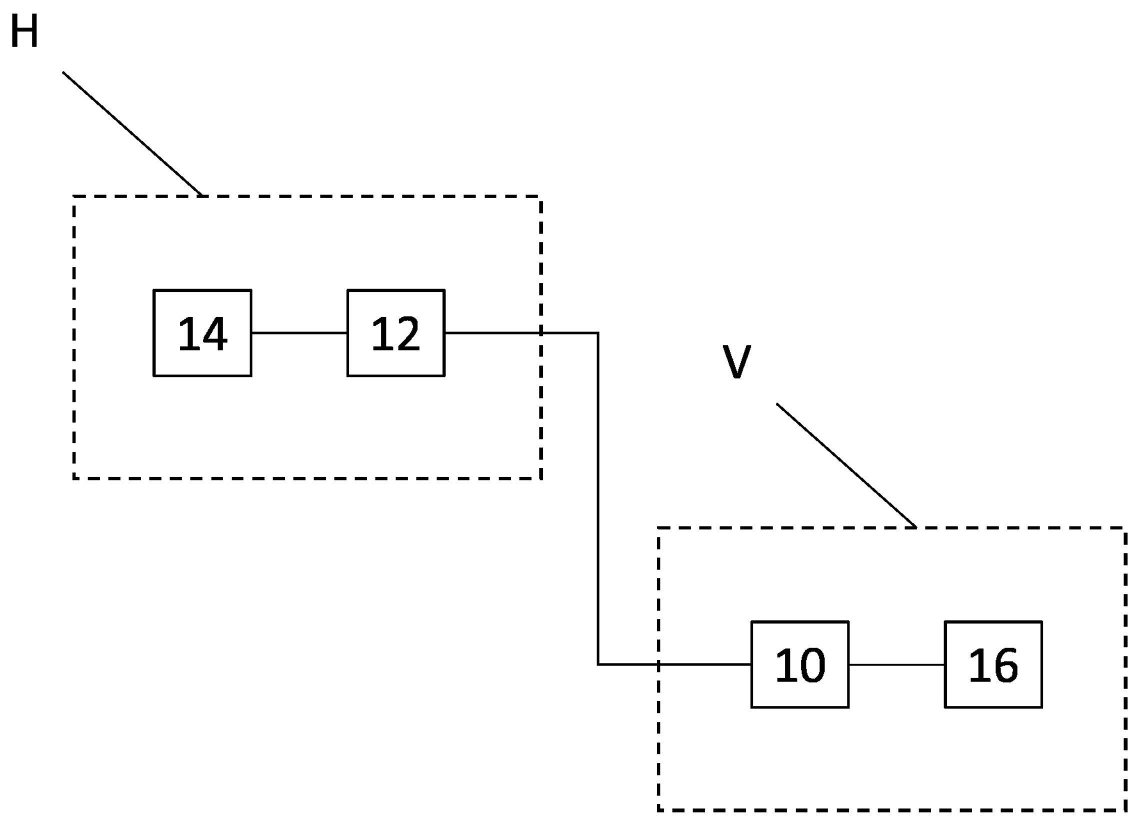
FIG. 9 is a schematic diagram of a system of this disclosure which makes use of a manifold block to protect hydraulically powered equipment of a vacuum material handler.

Referring now to FIGS. 1-9, shown is a manifold block designated generally 10. Manifold block 10 is for locating between an AB switch 12 in conjunction with a hydraulic supply 14 of a host piece of equipment H, such as an excavator, backhoe or other heavy equipment commonly used to move large diameter pipe and flat stock steel, and hydraulically powered equipment 16 of a vacuum material handler V, such as a rotator. AB switch 12 directs flow and pressure from hydraulic supply 14 in one of two directions.

Manifold block 10 is provided for establishing upper flow rates and upper pressure limits and for facilitating two-way flow.

Equipment 16 defines equipment A port 18 and equipment B port 20. Manifold block 10 defines manifold block body 30 having an A port 32 and a B port 34. Manifold block body 30 additionally defines an A interface port 36 and a B interface port 38. A interface port 36 and B interface port 38 are provided for communicating with equipment A port 18 and equipment B port 20.

AB switch 12 is provided for directing flow from hydraulic supply 14 to A port 32 or B port 34.

For purposes of this disclosure, A flow is defined as flow in a direction of travel from A port 32 to B port 34. A flow is delivered from hydraulic supply 14 under an A pressure.

For purposes of this disclosure, B flow is defined as flow in a direction of travel from B port 34 to A port 32. B flow is delivered from hydraulic supply 14 under B pressure.

Manifold block body 30 defines A pathway 40 having a first end and in communication with A port 32 and a second end in communication with A interface port 36.

Manifold block body 30 defines B pathway 50 having a first end in communication with B port 34 and a second end in communication with B interface port 38.

A flow control 60 is located in A pathway 40. In one embodiment, A flow control 60 is pressure compensated. In one embodiment, A flow control 60 is a needle valve.

A check valve bypass 62 is provided for directing flow around A flow control 60 during a condition of B flow.

Manifold block body 30 defines A pressure relief pathway 80 having a first end in communication with A pathway 40 and a second end in communication with B pathway 50.

A pressure relief valve 90 is located in A pressure relief pathway 80. A pressure relief valve 90 is configured to open when A pressure is greater than an A threshold pressure. A pressure relief valve 90 is provided for maintaining conditions of A flow through A pathway 40, out A interface port 36, and into equipment A port 18 when A pressure is less than the A threshold pressure. In one embodiment, A pressure relief valve 90 is a differential area poppet type valve. In one embodiment, A pressure relief valve 90 is adjustable.

B flow control 100 is located in B pathway 50. In one embodiment, B flow control 100 is pressure compensated. In one embodiment, B flow control 100 is a needle valve.

B check valve bypass 102 is provided for directing flow around B flow control 100 during a condition of A flow.

B pressure relief pathway 120 is provided having a first end in communication with B pathway 50 and a second end in communication with A pathway 40.

B pressure relief valve 130 is provided in B pressure relief pathway 120. B pressure relief valve 130 is configured to open when B pressure is greater than B threshold pressure. B pressure relief valve 130 is for maintaining a condition of B flow through B pathway 50 out said B interface port 38 and into equipment B port 20 when B pressure is less than B threshold pressure. In one embodiment, B pressure relief valve 130 is a differential area poppet type valve. In one embodiment, B pressure relief valve 130 is adjustable.

A method of protecting hydraulically powered equipment for connection to a machine having a hydraulic supply comprising the steps of: locating a manifold block body between the hydraulic supply and the hydraulically powered equipment 200, said manifold block body defining a first side and a second side; communicating said first side with the hydraulic supply 202, said first side defining a first port and a second port; communicating said second side with the hydraulically powered equipment 204, said second side defining a first interface port and a second interface port; flowing fluid at a first pressure and at a first flow rate through a selected one of said first port and said second port into said manifold block body 206; controlling pressure and flow rate of fluid passing out of said first interface port 208*a* or said second interface port 208*b* and into the hydraulically powered equipment.

The method further comprising the steps of: controlling a fluid flow rate for fluid traveling in a first direction through a first passageway with a first flow controller 210*a*; controlling a fluid flow rate for fluid traveling in a second direction through a second passageway with a second flow controller 210*b*; flowing fluid through a first flow bypass for allowing fluid flow in said second direction to bypass said first flow controller 212*a*; flowing fluid through a second flow bypass for allowing fluid flow in said first direction to bypass said second flow controller 212*b*.

Thus, embodiments of a manifold block of this disclosure are well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this disclosure as defined by the claims.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)–(a second number)", this means a range whose lower limit is the first number and whose upper limit is the second number.

For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

What is claimed is:

1. A vacuum material handler including a hydraulically powered equipment connectable to a hydraulic supply of a host piece of equipment, the vacuum material handler comprising:

a manifold block located on the vacuum material handler between the hydraulic supply and the hydraulically powered equipment of the vacuum material handler, the manifold block including a manifold block body comprising:

a first side defining a first port and a second port in communication with an AB switch connected to the hydraulic supply of the host piece of equipment and a second side defining a first interface port and a second interface port in communication with the hydraulically powered equipment of the vacuum material handler;

a first passageway connecting the first port and the first interface port and a second passageway connecting the second port and the second interface port;

a first pressure control and a second pressure control located toward the first side of the manifold block for controlling a pressure of fluid, the first pressure control arranged along the first passageway for controlling a pressure of fluid passing out of said first port, the second pressure control arranged along the second passageway for controlling a pressure of fluid passing out of said second port;

a first flow controller and a second flow controller located toward the first side of the manifold block, the first flow controller arranged along the first passageway for controlling a rate of fluid passing out of said first port, said second flow controller arranged along the second passageway for controlling a rate of fluid passing out of the second port;

a first pressure relief pathway and a second pressure relief pathway located toward the second side of the manifold block, each pressure relief pathway having one end in communication with said first passageway and another end in communication with said second passageway;

a first pressure relief valve in said first pressure relief pathway for relieving pressure in said first passageway ahead of said first interface port when pressure in the first passageway is above a predetermined threshold, said first pressure relief pathway defining an unobstructed path from said first passageway to said first pressure relief valve;

a second pressure relief valve in said second pressure relief pathway for relieving pressure in said second passageway ahead of said second interface port when pressure in the second passageway is above a predetermined threshold, said second pressure relief pathway defining an unobstructed path from said second passageway to said second pressure relief valve.

2. The manifold block according to claim 1 further comprising:

a first flow bypass for allowing fluid flow in a second direction to bypass said first flow controller;

a second flow bypass for allowing fluid flow in a first direction to bypass said second flow controller.

3. The manifold block according to claim 2 wherein:

said first flow controller is pressure compensated;

said second flow controller is pressure compensated.

4. The manifold block according to claim 1 wherein:

said first pressure relief valve is adjustable;

said second pressure relief valve is adjustable.

5. A method of protecting a hydraulically powered equipment of a vacuum material handler when connected to a host machine having a hydraulic supply and an AB switch connected to the hydraulic supply, the method comprising:

locating a manifold block body between the hydraulic supply and the hydraulically powered equipment, said manifold block body defining a first side and a second side;

communicating said first side with the hydraulic supply, said first side defining a first port and a second port;

communicating said second side with the hydraulically powered equipment, said second side defining a first interface port and a second interface port;

flowing fluid at a first pressure and at a first flow rate in one of two directions of possible two-way flow, namely through a selected one of said first port and said second port into said manifold block body in a first direction from said first port through the hydraulically powered equipment to said second port or in a second direction from said second port through the hydraulically powered equipment to said first port;

relieving pressure of fluid passing out of said first port along a first passageway or said second port along a second passageway and into the hydraulically powered equipment, the relieving being by way of a first pressure relief valve and a second pressure relief valve located toward the second side of the manifold block body, the first pressure release valve relieving pressure ahead of said first interface port when the pressure in said first passageway is above a predetermined threshold, the second pressure relief valve relieving pressure in said second passageway ahead of said second interface port when pressure in the second passageway is above a predetermined threshold;

wherein when said flow enters said first port, said flow communicates with the first pressure relief valve in a first pressure relief pathway;

wherein when said flow enters said second port, said flow communicates with the second pressure relief valve in a second pressure relief pathway.

6. The method according to claim 5 further comprising the steps of:

controlling a fluid flow rate for fluid traveling in said first direction through a first passageway with a first flow controller;

controlling a fluid flow rate for fluid traveling in said second direction through a second passageway with a second flow controller;

flowing fluid through a first flow bypass for allowing fluid flow in said second direction to bypass said first flow controller;

flowing fluid through a second flow bypass for allowing fluid flow in said first direction to bypass said second flow controller.

* * * * *